United States Patent
Bender

(10) Patent No.: US 7,434,200 B2
(45) Date of Patent: Oct. 7, 2008

(54) USING INCREMENTAL GENERATION TO DEVELOP SOFTWARE APPLICATIONS

(75) Inventor: Joachim Bender, Weinheim (DE)

(73) Assignee: SAP AG, Walldorf (DE)

( * ) Notice: Subject to any disclaimer, the term of this patent is extended or adjusted under 35 U.S.C. 154(b) by 830 days.

(21) Appl. No.: 10/735,513

(22) Filed: Dec. 11, 2003

(65) Prior Publication Data

US 2005/0132343 A1 Jun. 16, 2005

(51) Int. Cl.
*G06F 9/44* (2006.01)
(52) U.S. Cl. ...................................... 717/100
(58) Field of Classification Search ......... 717/100–101, 717/106–108, 116
See application file for complete search history.

(56) References Cited

U.S. PATENT DOCUMENTS

| | | | | |
|---|---|---|---|---|
| 5,794,001 | A * | 8/1998 | Malone et al. | 715/762 |
| 5,900,870 | A * | 5/1999 | Malone et al. | 715/866 |
| 6,106,569 | A * | 8/2000 | Bohrer et al. | 717/100 |
| 6,298,476 | B1 * | 10/2001 | Misheski et al. | 717/101 |
| 6,701,517 | B1 * | 3/2004 | Moore et al. | 717/121 |
| 6,851,105 | B1 * | 2/2005 | Coad et al. | 717/106 |
| 6,973,640 | B2 * | 12/2005 | Little et al. | 717/106 |
| 7,003,759 | B2 * | 2/2006 | Jameson | 717/120 |
| 7,168,062 | B1 * | 1/2007 | Schmitter | 717/110 |
| 7,197,739 | B2 * | 3/2007 | Preston et al. | 717/106 |
| 7,219,305 | B2 * | 5/2007 | Jennings | 715/761 |
| 7,219,328 | B2 * | 5/2007 | Schloegel et al. | 717/104 |
| 2004/0010775 | A1 * | 1/2004 | Matsa et al. | 717/116 |
| 2004/0205711 | A1 * | 10/2004 | Ishimitsu et al. | 717/116 |
| 2004/0250258 | A1 * | 12/2004 | Raghuvir et al. | 719/315 |
| 2004/0250259 | A1 * | 12/2004 | Lauterbach et al. | 719/315 |
| 2005/0091185 | A1 * | 4/2005 | Koutyrine et al. | 707/1 |
| 2005/0216884 | A1 * | 9/2005 | Tchochiev | 717/106 |

OTHER PUBLICATIONS

Abrams, Mark, et al., "UIML: An XML Language for Building Device-Independent User Interfaces," Dec. 1999, retrieved from the Internet on May 17, 2004, at http://www.harmonia.com/resources/papers/xml99Final.pdf, XP002280477, 15 pgs.

Abrams, Marc, et al., "User Interface Markup Language (UIML) Specification, Version 3.0," Feb. 8, 2002, retrieved from the Internet on May 18, 2002, at http://www.uiml.org/specs/docs/uiml30-revised02-12-02.pdf, XP002280679, 116 pgs.

(Continued)

*Primary Examiner*—Wei Y. Zhen
*Assistant Examiner*—Chih-Ching Chow
(74) *Attorney, Agent, or Firm*—Fountainhead Law Group P.C.

(57) ABSTRACT

There are methods and apparatus, including computer program products, for using incremental generation to develop an application. The incremental generation includes identifying a first main development object. Main development objects related to the first main development objects by an aggregation relationship are identified. Main development objects related to the first main development object by an association relationship are also identified. A determination is made as to whether any identified main development objects have changed. If any identified main development objects have changed, the first main development object is re-generated.

17 Claims, 6 Drawing Sheets

OTHER PUBLICATIONS

Ali, Mir Farooq, et al., "Building Multi-Platform User Interfaces with UML," Nov. 9, 2001, retrieved from the Internet on May 17, 2004, at http://arxiv.org/ftp/cs/papers/0111/0111024.pdf, XP002280476, XP002280477, XP002280490, 12 pgs.

"Computer Science, abstract," Arxiv.org E-Print Archive, retrieved from the Internet on May 17, 2004, at http://arxiv.org/abs/cs.HC/0111024, XP002280478, 1 pg.

Kagle, Kurt, et al., "Professional XSL," 2001, Wrox Press Ltd., Arden House, Birmingham, UK, XP002281359, p. 742.

Levine, John R., "Linkers & Loaders," 2000, Morgan Kaufmann Publishers, San Francisco, CA, XP002283283, p. 48.

Phanouriou, Constantinos, "UIML: A Device-Independent User Interface Markup Language," Virginia Polytechnic Institute and State University, Sep. 26, 2000, retrieved from the Internet on May 17, 2004, at http://scholar.lib.vt.edu/theses/available/etd-08122000-19510051/unrestricted/PhanouriouETD.pdf, XP002280491, 172 pgs.

Phanouriou, Constantinos, "User Interface Markup Language (UIML) Draft Specification, Version 2.0a," Jan. 17, 2000, retrieved from the Internet on May 17, 2004, at http://www.uiml.org/specs/docs/uiml20-17Jan00.pdf, XP002280490, 64 pgs.

* cited by examiner

USING INCREMENTAL GENERATION TO DEVELOP SOFTWARE APPLICATIONS

BACKGROUND

The present invention relates to data processing by a computing device, and more particularly to using incremental generation to develop applications.

A user interface (UI) facilitates the interaction between humans and computers by inviting and responding to user input. User interfaces come in many varieties, and are designed to work in concert with application programs. A common scenario involving user interfaces is a network application, where a network connects an application program running on a server and one or more user interfaces running on client devices. The client/server relationship is one in which a server provides services to the client devices. Both the client devices and the server typically have a network interface for accessing networks such as a local area network (LAN), a wide area network (WAN), or the Internet.

In a network environment, a common client device is a personal computer, and a common client program is a Web browser. The client program, which displays a user interface for an application running on a server, enables networked communication between the client device and the server using a data transfer protocol, e.g., the Hypertext Transfer Protocol (HTTP), to exchange files, images, programs, or application data. HTTP is a request/response-type protocol that specifies how the client device and the server communicate with each other. The server may receive a request from the client device using HTTP, respond to the request, and then close the connection. HTTP is a stateless protocol, meaning that each time a client device requests a Web page, the server will respond to the request independently of any previous requests by the client device, and without recording the request.

The information transmitted from the server and intended for display in the client program on the client device may be marked up with Hypertext Markup Language (HTML) code or Extensible Markup Language (XML) code. HTML is a language that is used to describe the structure of a document, such as a Web page. Client programs interpret HTML code to determine how to display the information contained in the page. A user may request a Web page from a server by clicking on a hyperlink or specifying a Uniform Resource Locator (URL) string. A URL can be used to identify the address of a file or Web page that may be accessed on a network. The address identifies the Web server on which the file is stored and the directory in which the file is located. When the server receiving the URL request finds the sought Web page, the server sends the page to the client device so that the client device can use that Web page, for example, by generating a display for a user according to the Web page.

SUMMARY OF THE INVENTION

The description describes methods and apparatus, including computer program products, for using incremental generation to develop applications. These applications include, for example, a user interface portion that is distributed over a network, such as the Internet.

In one aspect, there is a method for using incremental generation to develop an application. The method includes identifying a first main development object. The method also includes identifying main development objects related to the first main development objects by an aggregation relationship and identifying main development objects related to the first main development object by an association relationship. The method also includes determining if any identified main development objects have changed and re-generating the first main development object if any identified main development objects have changed.

In other examples, the method has one or more of the following features. Identifying main development objects related to the first main development objects by the aggregation relationship by following all aggregation relationships to other main development objects. Identifying main development objects related to the first main development objects by the association relationship by following association relationships only to a next main development object. Identifying main development objects related to the first main development objects by the association relationship by following aggregation relationships and then a subsequent association relationship only to a next main development object. Identifying a second main development object, where the first main development object is a root main development object associated with the second main development object. Identifying the second main development object by identifying a non-MDO development object as a starting point and asking the non-MDO development object what its MDO is.

In some examples, for each child main development object of the root main development object, the method includes identifying a child main development object that has not been considered. The method of these examples also includes identifying main development objects related to the child main development objects by an aggregation relationship and identify main development objects related to the child main development object by an association relationship. The method includes determining if any identified main development objects have changed, and re-generating the child main development object if any identified development objects have changed.

In some examples, the main development objects correspond to file borders. The method includes identifying main development objects related to the first main development objects by the association relationship by following association relationships only across a single file border to a next main development object. The method includes identifying all main development objects that have changed based on identified files that have changed. The identified files that have changed are identified by a resource tree traversal or a notification from a metamodel to which the main development objects correspond. The first main development object corresponds to a development object identified by a development tool making a request for re-generation.

In another aspect, there is a computer program product, tangibly embodied in an information carrier, for using incremental generation to develop applications. The computer program product is operable to cause data processing apparatus to perform any combination of the methods and features described above.

In yet another aspect, there is a system for using incremental generation to develop applications. The system includes a generator. The generator includes a search module, a comparator module, and a generation module. The search module is configured to identify a first main development object, to identify main development objects related to the first main development objects by an aggregation relationship, and to identify main development objects related to the first main development object by an association relationship. The comparator module is configured to determine if any identified main development objects have changed. The generation module is configured to re-generate the first main development object if any identified development objects have changed.

In other examples, the system has one or more of the following features. The system includes a development tool configured to identify files that have changed, and the comparator module is further configured to determine if any identified main development objects have changed based on information from the development tool identifying files that have changed. The system includes a development tool, and the comparator module is further configured to receive an indication of the first main development object from the development tool. The system includes a cache, and the comparator module is further configured to store the identified main development objects in the cache.

Implementations can realize one or more of the following advantages. The use of incremental generation allows a much faster generation process and requires fewer resources to generate executable code because the entire application does not have to be generated, only a portion of it. Incremental generation advantageously uses features of a metamodel. One implementation of the invention provides all of the above advantages.

The details of one or more examples are set forth in the accompanying drawings and the description below. Further features, aspects, and advantages of the invention will become apparent from the description, the drawings, and the claims.

DETAILED DESCRIPTION

Overview

Figure 1:
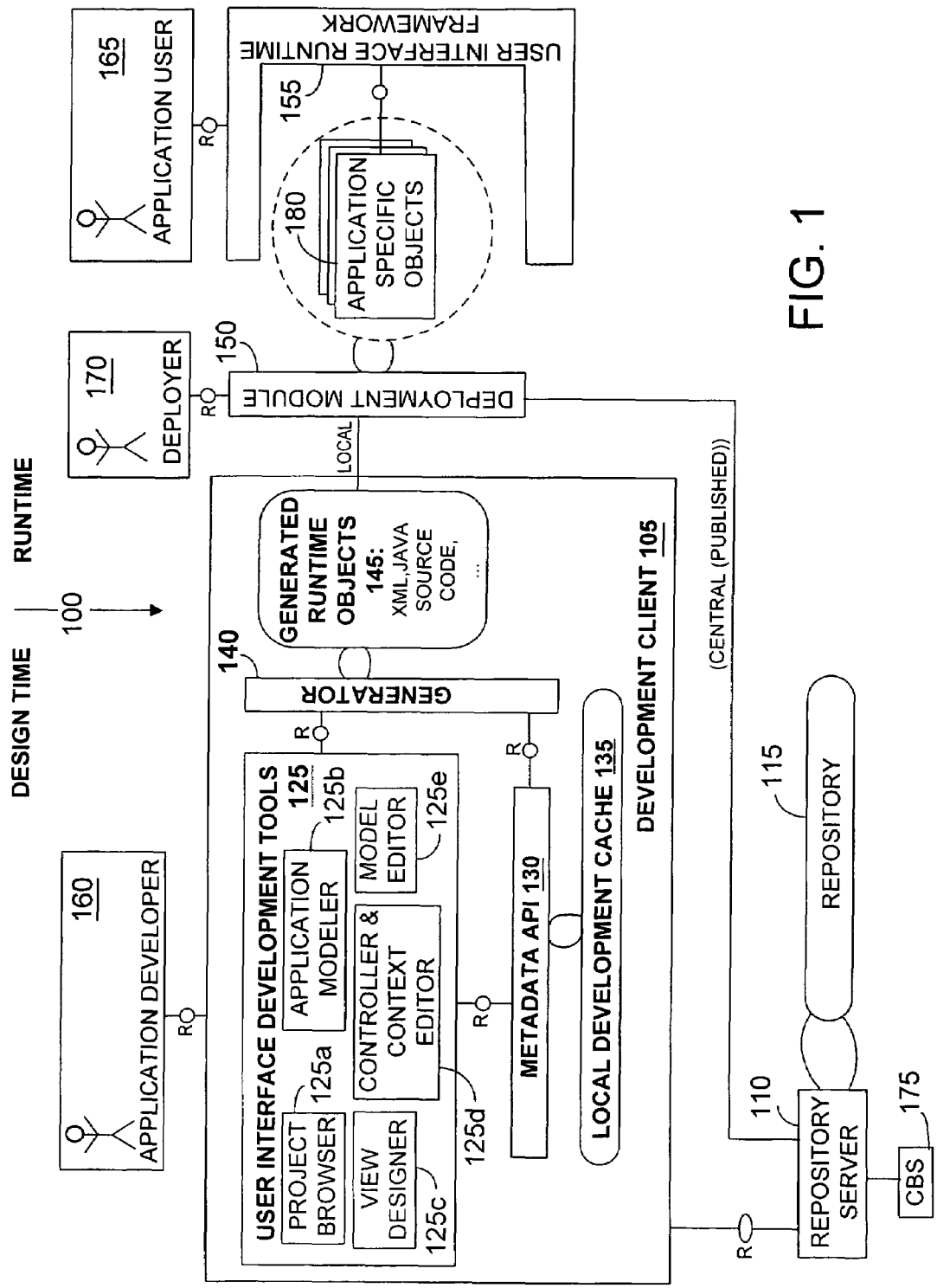
FIG. 1 is a block diagram of a system to allow a user to develop, deploy, and execute applications.

FIG. 1 illustrates a system 100 that can be used to develop, deploy, and execute applications that include a user interface (UI) portion. To accomplish these tasks, the system 100 includes both design time and runtime elements. System 100 includes a development client 105, which communicates with a repository server 110 that serves as an interface for a repository 115. Development client 105 includes user interface development tools 125, a metadata application program interface (API) 130, a local development cache 135, a generator 140, and a cache 145 for generated runtime objects. As illustrated in FIG. 1, user interface development tools 125 can include a project browser 125a, an application modeler 125b, a view designer 125c, a controller and context editor 125d, and a model editor 125e. System 100 also includes a deployment module 150 and a user interface runtime framework 155.

In operation, an application developer 160 uses development client 105 to develop, for example, a Web user interface application. Application developer 160 uses the applicable user interface development tools 125 to create and modify elements of the user interface application. An advantage of system 100 is that application developer 160 does not need to create source code to develop the application. Instead, application developer 160 develops the application using a highly declarative programming model that uses metadata to define the elements of the application. In such an example, instead of dealing with program code, application developer 160 creates development objects and defines relations between these development objects. Development objects represent the declarative building blocks development client 105 manages. Development object content is also called metadata. In other words, application developer 160 "composes" development objects in a declarative way, using metadata, rather than writing "code" to create a user interface application. As explained in more detail below, system 100 uses a metamodel to define the development objects and a metadata API 130. Some example development objects for a user interface application include UI elements (e.g., screen controls such as buttons and input fields), views (e.g., displays with layouts of UI elements), data bindings (e.g., bindings between UI elements and application data), inbound and outbound plugs as start- and end-points for navigational links between the views, and the like.

System 100 stores the development objects in repository 110. In one implementation, system 100 stores the development objects as platform-independent descriptions (for example, XML files). To create and modify development objects, user interface development tools 125 interact with a metadata API 130. In the illustrated example, metadata API 130 uses local development cache 135 to store those development objects with which user interface development tools 125 are currently interacting. After the development objects have been created, generator 140 uses those objects to generate runtime objects (e.g., classes and source code) that can be deployed for use by an application user 165. In other words, because the development objects are a declarative representation, development client 105 transforms those development objects into source code that system 100 can compile to execute the application. Generator 140 can generate the runtime objects using specific languages such as, for example, Java, XML, and/or other platform-neutral or platform-specific source code. As illustrated, system 100 stores the generated runtime objects in cache 145. Local development cache 135 and runtime cache 145 can be the same physical device with, for example, different directories for development objects and runtime objects.

After the runtime objects have been generated, a deployer 170 uses deployment module 150 to deploy the generated runtime objects to an application server. Deployment module 150 can deploy local objects from cache 145, for example, if application developer 160 wants to evaluate created and/or modified objects in a runtime environment. Deployment module 150 can also deploy runtime objects from a central storage module, such as repository 110, where the runtime objects have been published (e.g., indicated ready for deployment). To publish objects, system 100 can use a component build server (CBS) 175 that performs verification operations to ensure that the objects will properly execute in a runtime environment. Once deployed to a server, the application specific objects 180 interact with the runtime framework 155 to render a user interface that application user 165 uses to interact with the application. As explained previously, in a network scenario, the rendered user interface is displayed to the application user 165 in a client program (e.g., a browser) on a client device. The runtime framework 155 can be used to provide services common to all applications (e.g., rendering of UI elements, selection of a suitable adapter to communicate with the client program, etc.).

Metamodel Relationship

Figure 2:
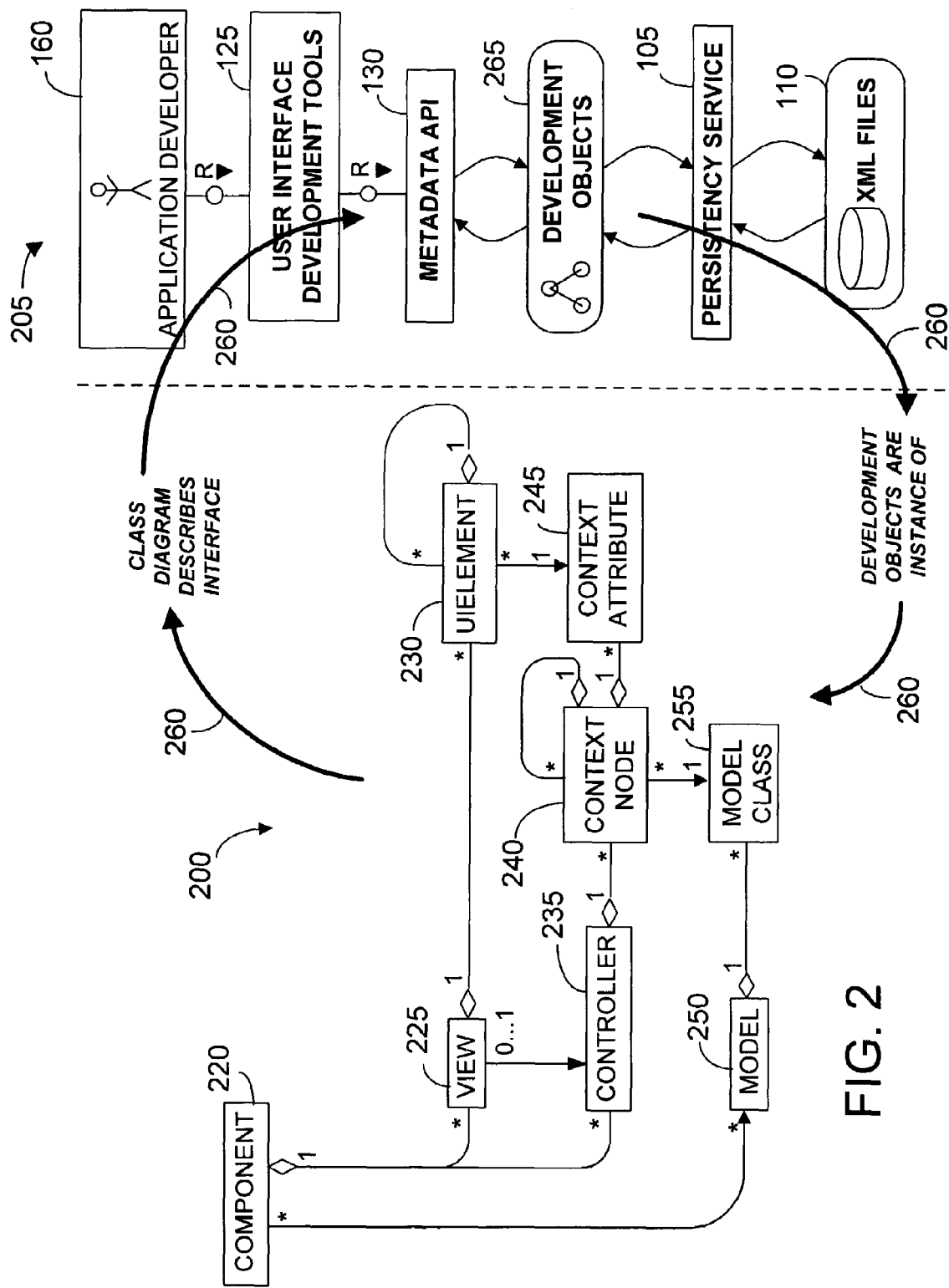
FIG. 2 is a block diagram of a metamodel and a portion of a development process.

As mentioned above, the development process in system 100 is based on a metamodel. FIG. 2 illustrates a metamodel 200 (e.g., a semantic information model), which is represented using a unified modeling language ("UML™") class diagram, in conjunction with a portion 205 of a development process for developing a user interface application 260. The specifications for UML™, which are set forth by the Object Management Group (0MG), can be found on OMG's web site.

As illustrated in FIG. 2, the classes of metamodel 200 can include application components 220, views 225 with UI elements 230, controllers 235 with context nodes 240 and context attributes 245, and models 250 with model classes 255. Components 220 represent reusable entities that can be used to group various application elements (e.g., models, views, controllers, and contexts). Context node 240, which is associated with controller 235, provides a storage area for the data used by the controller 235, as well as methods for storing and accessing the data based on a declared data structure. The metamodel 200 also can include relationships between the metamodel classes, as shown in FIG. 2. The UML™ class diagram of the metamodel 200 can be viewed, in essence, as a formal description of the programming model for a user interface application. An advantage of using UML to represent metamodel 200 is that the representation of the metamodel is platform-independent.

Arrows 260 represent relationships between the metamodel 200 and the portion 205 of the development process. FIG. 2 notes two relationships in particular, namely, one with an interface, and one with the instances of development objects 265. In both cases, the classes of metamodel 200 form a basis for the development process. In other words, metamodel 200 defines the constraints to which all user interface applications and the development of those applications have to conform.

The latter of the two relationships, represented by the bottom arrows 260, is that the development objects 265 that represent a user interface application (or portions thereof) are instances of the metamodel classes of metamodel 200. The former of the two relationships, represented by the top arrows 260, is that the class diagram representation of metamodel 200 describes the interface (e.g., the metadata API 130) used in the portion 205 of the development process. All clients (e.g., development tools 125) that need to create, modify, or otherwise access the development objects 265 do so via a common interface (e.g., the metadata API 130). The metadata API 130 can be derived from the metamodel 200. An advantage to this approach is that a derived interface exposes exactly those development object types that are defined by the metamodel used in the derivation process. In other words, API 130 enforces the restrictions defined by the metamodel. Metadata API 130 can also be used to obtain location information when application development tools 125 are marshalling development objects 265 to and from their persistent representation (e.g., an XML representation) in storage module 135 (e.g., local cache).

Metamodel Details

Figure 3:
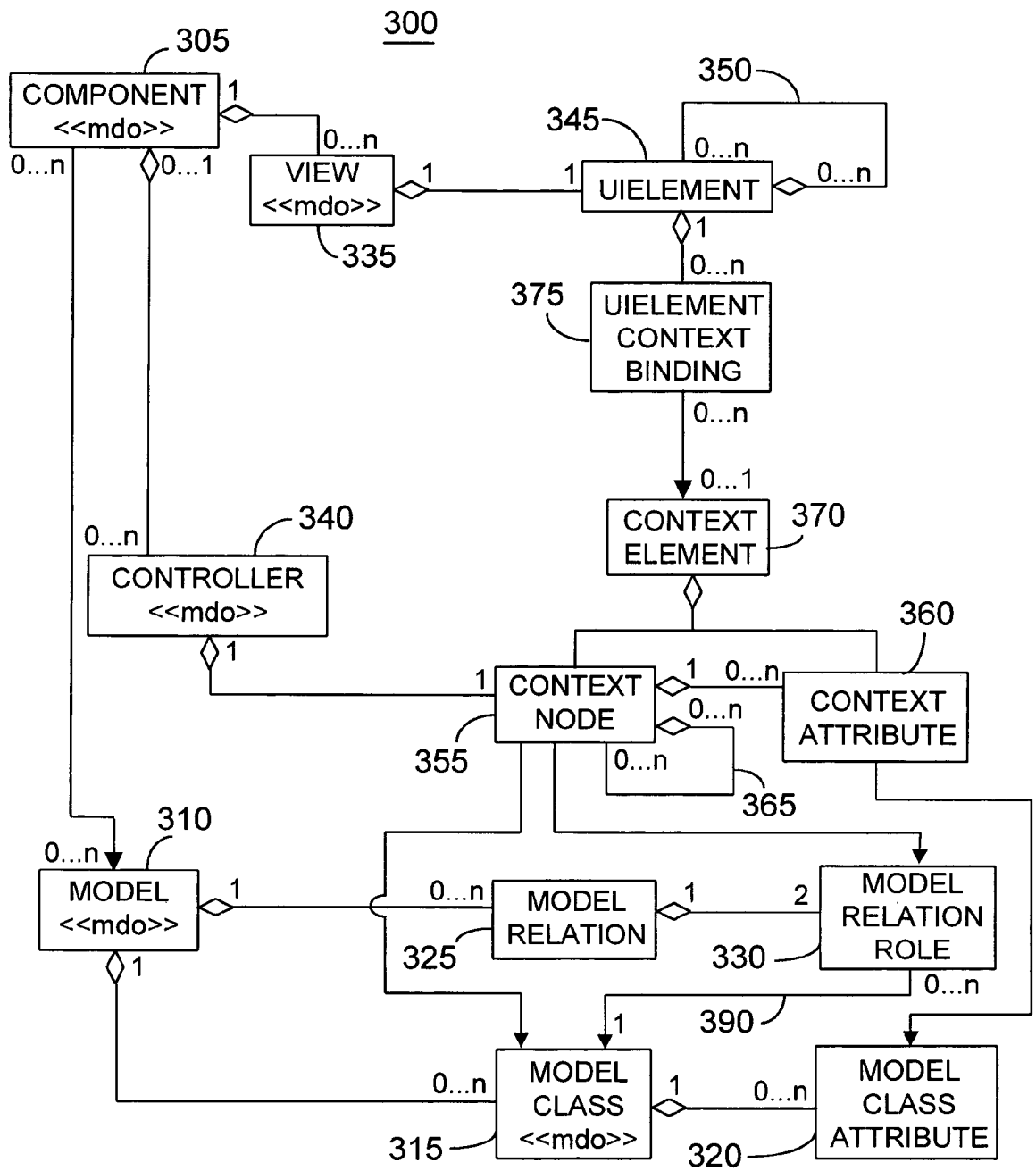
FIG. 3 is a block diagram of another metamodel.

FIG. 3 illustrates a UML™class representation of another metamodel 300. The classes of metamodel 300 include a component 305, which is associated with a model 310. In UML™, an association represents a semantic relationship between two classes that involves a connection between the instances of those classes. Model 310 includes an aggregation of zero or more model classes 315. In UML™, an aggregation is a form of an association that represents a whole-part relationship between an aggregate (the whole) and the constituent part(s). The open diamond of an aggregation association is located at the aggregate class. Model class 315 includes an aggregation of zero or more model class attributes 320. Model 310 also includes an aggregation of zero or more model relations 325. Model relation 325 includes an aggregation of two instances of the class model relation role 330.

In addition to the association with model 310, component 305 includes an aggregation of zero or more views 335 and zero or more controllers 340. View 335 includes an aggregation of a User Interface (UI) element 345. As illustrated by relationship 350, UI element 345 can include an aggregation of other UI elements 345. Controller 340 includes an aggregation of a context node 355. Context node 355 includes an aggregation of zero or more context attributes 360. As illustrated by relationship 365, context node 355 also can include an aggregation of other context nodes 355. Context node 355 is associated with model class 315 and model relation role 330. Context attribute 360 is associated with model class attribute 320. Context element 370 is a general class from which either of the specialized classes context node 355 or context attribute 360 are derived. In UML™, a generalization shows an inheritance relationship between objects. The hollow arrowhead points to the general class (e.g., superclass). UI element context binding 375 is associated with context element 370. In an implementation example, this represents that UI element context binding 375 can be associated with context node 355 or context attribute 360. UI element 345 also includes an aggregation of zero or more UI element context bindings 375.

As described above, each relationship has a multiplicity. Generally, the multiplicity (also referred to as cardinality) represents the number of instances at each end of an illustrated relationship. The multiplicities illustrated in metamodel 300 are "1", representing one instance, "2", representing two instances, "0 . . . 1", representing either zero or one instance, "0 . . . n", representing zero or more instances (also represented using "*"), and "1 . . . n", representing one or more instances. For example, the multiplicity between the association for component 305 and model 310 is zero or more (0 . . . n) instances of component 305 to zero or more (0 . . . n) instances of model 310. The multiplicity between the aggregation relationship for model relation 325 and model relation role 330 is two instances of model relation role 330 to one instance of model relation 325. This is because a model relation role 330 represents the endpoint of a model relation 325. In metamodel 300, this multiplicity shows that each model relation 325 has two endpoints (i.e., two model relation roles 330).

Special Features Using the Customizable Extensions of UML™

The portions of the metamodel shown in FIG. 3 illustrate both standard UML™ constructs and customizable extensions, such as stereotypes. Using these customizable extensions, the metamodel can be extended beyond the standard UML™ definitions to add additional features and functionality to the derived metadata API 130, thereby including customized features within API 130. These features enable API 130 to be more than just a development layer for creating and persisting development objects.

One set of features uses the customizable extensions stereotype and tagged value of UML™ to customize the metamodel classes. For example, one feature is to use a stereotype <<mdo>> for a class. Using this stereotype indicates that the class is a main development object (MDO) of a metamodel. A main development object indicator specifies that instances of the marked class (i.e., the class marked with the <<mdo>> stereotype) are persisted into one XML file together with any non-MDO children objects. Use of this feature enables the metamodel designer to determine where the file borders are located with respect to the persisted development objects, which can be used to determine the granularity of certain features performed at the main development object level.

For example, in metamodel 300 illustrated in FIG. 3, class Model 310 includes a <<mdo>> stereotype. The <<mdo>> stereotype indicates that when persisting instances of class Model 310, each of those instances is stored in a separate file. Further, instances of the classes ModelRelation 325 and ModelRelationRole 330 related with the instance of class Model 310 are stored in the same file, as those are non-MDO children or ancestor development objects of the class Model 310 in metamodel 300. However, instances of ModelClass 315 that are also related with the instance of class Model 310 are stored in a separate file, because class ModelClass 315 includes a <<mdo>> stereotype and is thus not a non-MDO child object. Because instances of non-MDO class ModelRelationRole 330 are stored with the instance of <<mdo>> class Model 310, whereas instances of ModelClass 315 are stored in a separate file, an association 390 between ModelRelationRole 330 and ModelClass 315 requires a reference to that separate file (e.g., a pointer) stored with the instances of ModelRelationRole 330.

Figure 4:
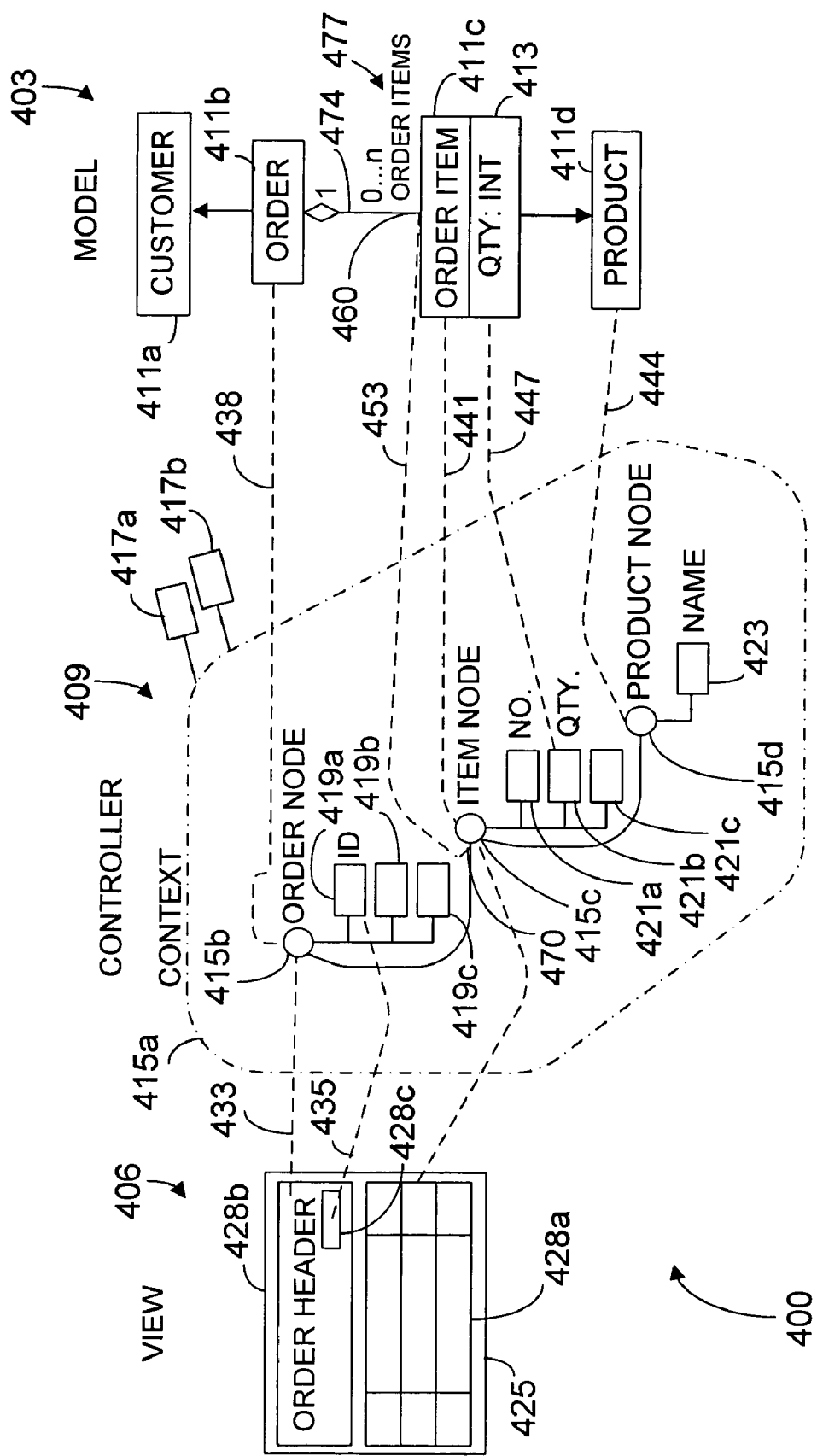
FIG. 4 is a block diagram of an example of a component instance.

To help show how metamodel 300 relates to a user interface application, FIG. 4 illustrates a simplified example of a component instance 400 (i.e., an instance of the component class 305) of a user interface application that includes instances of some of the other classes of metamodel 300. For clarity, the elements of component 400 and their associations are described first, and then the elements and associations are related back to metamodel 300. Component instance 400 is associated with instances of a model 403, a view 406, and a controller 409. Model 403 represents a model of the business application that this user interface application represents. View 406 represents a UI layout that the user interface application displays to a user. Controller 409 is the binding logic that associates UI view 406 to business application model 403. As illustrated, the simple example user interface application 400 represents an application to view and modify data associated with a customer order.

Model 403 includes model classes customer 411a, order 411b, order item 411c, and product 411d (generally model classes 411). Model classes 411 are illustrated in FIG. 4 using a UML™ representation. Model class 411c includes an attribute 413. Attribute 413 is labeled "Qty." and is an integer type. Controller 409 includes context nodes context 415a, order node 415b, item node 415c, and product node 415d (generally context nodes 415). Each context node 415 includes one or more context attributes. Context node 415a includes attributes 417a and 417b. Context node 415b includes attributes 419a (labeled "ID"), 419b, and 419c. Context node 415c includes attributes 421a (labeled "No."), 421b (labeled "Qty."), and 421c. Context node 415d includes attribute 423 (labeled "Name"). The attributes are generally referred to as attributes 417, 419, 421, and 423. View 406 includes a display layout 425 that includes UI elements 428a, 428b, and 428c (generally UI elements 428).

Component 400 includes associations 431, 433, and 435, which represent data bindings between view 406 and controller 409. As illustrated, the data bindings are between UI elements and context nodes or context attributes. Associations 431 and 433 are between UI elements 428a and 428b and context nodes 415c and 415b, respectively. Association 435 is between UI element 428c and context attribute 419a.

Component 400 also includes associations 438, 441, 444, 447, and 453, which represent data bindings between model 403 and controller 409. As illustrated, the data bindings are between model classes and context nodes, model relation roles and context node dependencies (e.g., parent-child relationship), or model class attributes and context attributes. Associations 438, 441, and 444 are between model classes 411b, 411c, and 411d and context nodes 415b, 415c, and 415d, respectively. Association 447 is between model class attribute 413 and context attribute 421b. Association 453 is between model relation role 460 and context node dependency 470. Model relation role 460 is one endpoint of aggregation relation 474 between order model class 411b and order item model class 411c. Model relation role 460 is named "order items" 477, to identify that model relation role 460 is the endpoint of relation 474 at order item model class 411c.

Relating this example back to metamodel 300 in FIG. 3, component instance 400 is an example instance of the component class 305 of the metamodel. Model 403 is an example instance of model class 310. Model classes 411 are example instances of model-class class 315. Attribute 413 is an example instance of model class attribute class 320. Relation 474 is an example instance of model relation class 325. Model relation role 460 is an example instance of model relation role class 330. Controller 409 is an example instance of controller class 340. Context nodes 415 are example instances of context node class 355. As illustrated in FIG. 3, the multiplicity of the aggregation between controller class 340 and context node class 355 is one instance of the former to one instance of the latter. The instance of controller 409 thus has a context node 415a (labeled "context") that serves as the root node of the context and the single instance of the context node aggregated to controller instance 409. The other context nodes 415b, 415c, and 415d are added under root context node 415a using aggregation relationship 365. Use of a single root node enables the developer of the user interface application to assign attributes (e.g., 417a and 417b) that are applicable to the entire context node tree, for example, Name and CustomerID of Customer whose orders are contained in the OrderNode.

Continuing with the example, attributes 417, 419, 421, and 423 are example instances of context attribute class 360. View 406 is an example instance of view class 335. UI elements 428 are example instances of UI element class 345. Associations 431, 433, and 435 are examples of the association between UI Element context binding class 375 and context element class 370. Metamodel 300 uses a context binding class 375 to bind elements of view 406 to elements of controller 409 because a single view element can be bound to multiple context elements (e.g., context nodes and/or context attributes), because view elements can have multiple bindable properties. Such a class is not used for binding elements of controller 409 to elements of model 403 because a single context element (e.g., context node and/or context attribute) is bound to a single element of model 403 (e.g., model class 411 or model attribute 413) since context elements have a single bindable property. Associations 438, 441, and 444 are examples of the association between context node class 355 and model-class class 315. Association 447 is an example of the association between context attribute class 360 and model-class class attribute 320. Association 453 is an example of the association between context node class 355 and model relation role class 330, defining the dependencies between instances of context nodes. Use of a model relation role (e.g., endpoint) to define dependencies between context nodes is advantageous because in a situation where either side of the model relation can be used (e.g., bidirectional relations), use of the relation role provides a directed relation to ensure the proper direction is followed.

Relating this example back to FIG. 1, in one possible scenario, application develop 160 creates the necessary development objects for a complete application and stores those development objects in repository 116. CBS 175 builds an application by having generator 140 generate runtime objects for the application based on the stored development objects. Subsequent to this process, application developer 160 finds it necessary to change some development objects. Instead of re-generating runtime objects for all of the development objects for the entire application, generator 140 advantageously only re-generates runtime objects associated with those development objects that have changed. This process is also referred to as incremental generation.

Because development objects can be related to each other through, for example, associations and aggregations, incremental generation involves more than simply re-generating those development objects that have changed. In other words, there is not a direct one-to-one correspondence between re-generation and changed development objects. Generator 140 must determine all of the development objects that are related to those development objects that changed to determine whether those related development objects must also be regenerated. Because the relationships of the development objects are based on a metamodel, as described above, generator 140 can use the metamodel to determine the relationships between development objects.

An Example Incremental Generation

Figure 5:
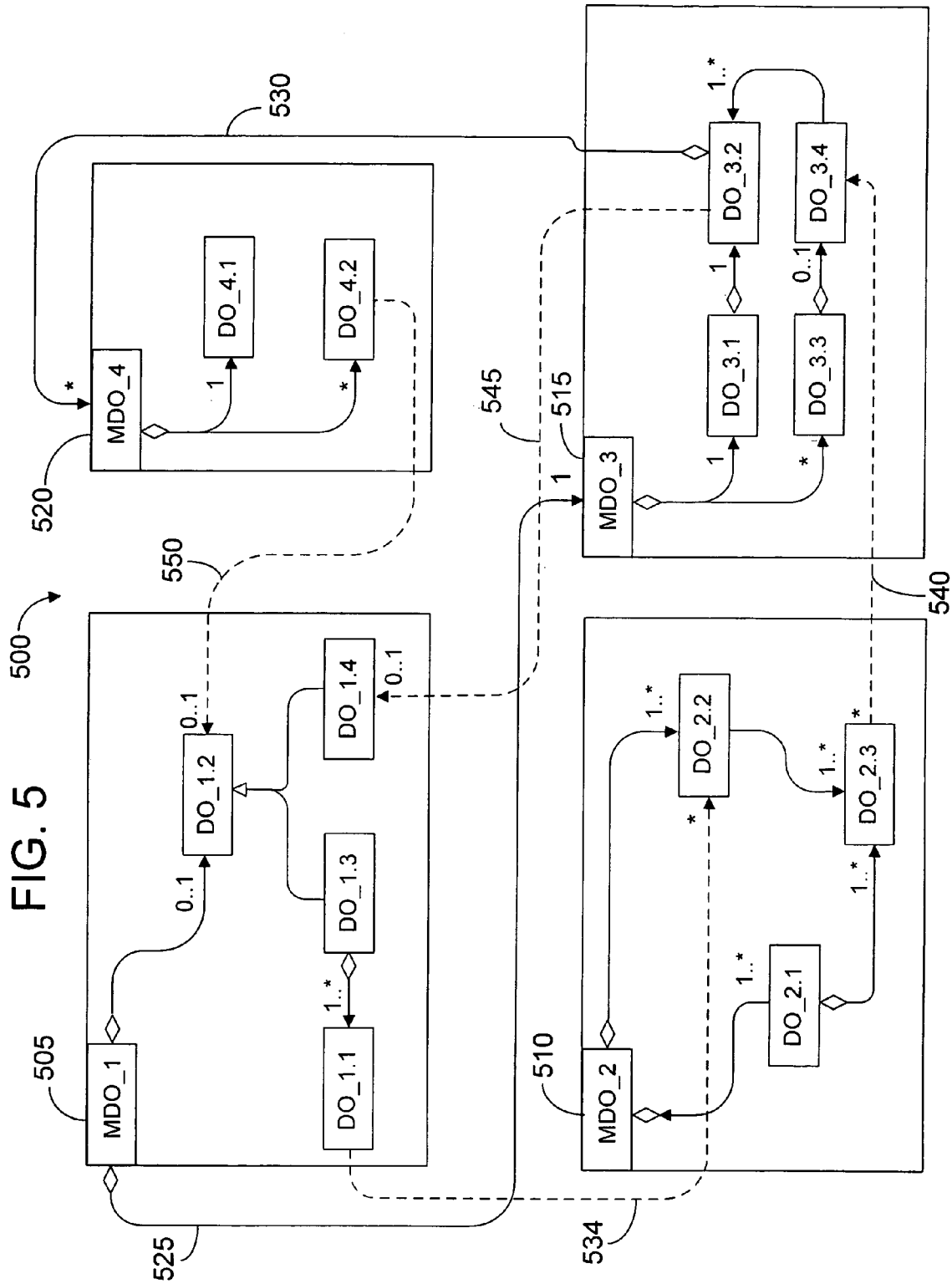
FIG. 5 is a block diagram of related instances of development objects of an application.

To help provide an example of how generator 140 determines which development objects to re-generate, FIG. 5 illustrates a generic portion 500 of an application with related main development objects 505, 510, 515, and 520. Each main development object 505, 510, 515, and 520 includes non-MDO development objects. For example, main development object 505 includes development objects DO_1.1, DO_1.2, DO_1.3 and DO_1.4. As described above, in some examples a main development object represent a file border for instances of so designated UML™ classes, where the main development object instance includes within the file instances of non-MDO children and ancestor development objects. Following these examples, each MDO 505, 510, 515, and 520 corresponds to a different file. As described in more detail below, generator 140 uses these file borders to determine which MDOs to re-generate. MDOs 505, 510, 515, and 520 are related to each other by aggregation relationships (e.g., 525 and 530) and association relationships (e.g., 535, 540, 545, and 550, shown as a dashed line). It is worth noting that some of the relationships between MDOs are a result of relationships directly between two MDOs, such as aggregation relationship 525. Other relationships, however, are a result of relationships between non-MDO development objects, such as association relationship 535, which is between development objects DO_1.1 and DO_2.2 and/or a result of relationships between a non-MDO development object and a MDO, such as relationship 530, which is between development object DO_3.2 and MDO 520. As described in more detail below, relationships are followed along any of these paths to determine relationships between MDOs.

Figure 6:
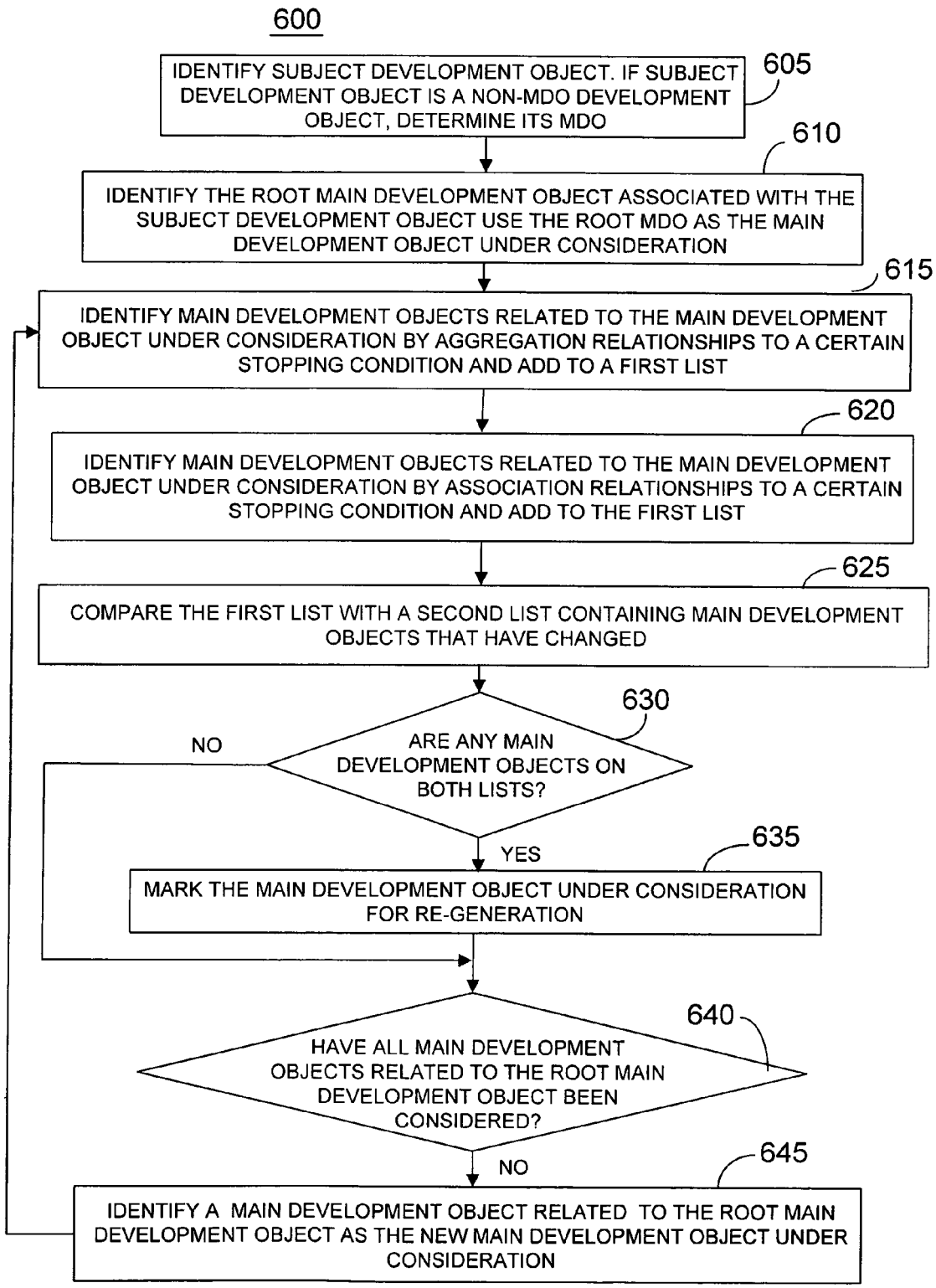
FIG. 6 is a block diagram of a process of incremental generation.

FIG. 6 illustrates an example process 600 generator 140 follows to determine which main development objects to re-generate. Generator 140 identifies (605) a subject development object. This can be, for example, a development object that application developer 160 has changed or a development object that is identified by development tools 125. The subject development object can be either a MDO or a non-MDO development object. For example, in metamodel 300, application developer changes model class attribute 320, which is a development object included in main development object model class 315. The subject development object is model class attribute 320. If the starting development object is a non-MDO development object, the MDO of this development object is determined (605). The MDO of the development object model class attribute 320, model class 315, can be determined by asking development object model class attribute 320 what its MDO is (e.g., using a predefined method associated with the development object that returns a value identifying its MDO). Generator 140 identifies (610) a root MDO associated with the subject development object. The identified root MDO becomes the MDO under consideration for referred to in process 600. Using the example of model class 315 as the MDO of the subject development object model class 315, a root MDO is component 305. Identifying a root MDO advantageously ensures that all other MDOs in the application that depend on the changed MDO model class 315 (e.g., controller MDO 340) are checked in process 600. The root MDO can be determined by asking the MDO what its root MDO is (e.g., using a predefined method associated with the main development object that returns a value identifying its root MDO).

Generator 140 identifies (615) all of the MDOs related to the MDO under consideration, in this case the root MDO, by aggregation relationships, subject to a certain stopping condition. Generator 140 adds each identified MDO to a first list. The stopping condition can be, for example, to include all leaf nodes related by aggregation. Using this example stopping condition, generator 140 follows all aggregation relationships (e.g., from MDO to MDO, from DO to DO, from DO to MDO, etc.) from one MDO to another until there are no more aggregation relationships to another MDO. Generator 140 also identifies (620) all of the MDOS related to the MDO under consideration, in this case the root MDO, by association relationships (e.g., from MDO to MDO, from DO to DO, from DO to MDO, etc.), subject to a certain stopping condition. Generator 140 also adds each identified MDO to the first list. The stopping condition can be, for example, to follow an association relationship only to the next MDO. In other words, the stopping condition is to cross only one file border when following association relationships. Generator 140 compares (625) all of the MDOs on the first list to a second list of MDOs that have changed since the last generation. When comparing (625) the MDOs on the first list with the MDOs on the second list, generator 140 determines (630) is any MDOs are on both lists. If one or more MDOs are on both lists, then generator 140 marks (635) the MDO under consideration, in this case the root MDO, to be re-generated. If there are no MDOs in common between the two lists, then the MDO under consideration does not have to be re-generated.

In some examples, generator 140 can derive the second list using the features of the development environment. For example, some development environments include a resource data tree that contains resources (e.g., files) that have been modified during the development session. Generator 140 can traverse the resource data tree to identify a file extension that corresponds to a MDO, thereby identifying which MDOs have changed according to the development tool. In other examples, generator 140 can request to be notified by the metamodel when an MDO is modified. In these examples, generator 140 can use the notifications to derive the second list.

Referring to FIG. 5 for an illustrative example, if MDO 505 is the MDO under consideration, generator 140 follows aggregation relationship 525 to MDO 515. Generator 140 adds MDO 515 to the first list. Because the stopping condition is to include leaf nodes, generator 140 follows any aggregation relationships from MDO 515 to other MDOs. So generator 140 follows aggregation relationship from MDO_3 to DO_3.1 and DO_3.3. From these two development objects, generator 140 follows their aggregation relationships to development objects DO_3.2 and DO_3.4. From development object DO_3.2, generator 140 follows aggregation relationship 530 to MDO 520 and also adds MDO 520 to the first list. Generator 140 continues and follows the aggregation relationships from MDO_4 to development objects DO_4.1 and DO_4.2. Because there are no aggregation relationships from MDO 520 to any other MDOs, generator 140 stops at MDO 520.

Moving to the association relationships, generator 140 follows association relationship 535 from MDO 505 to MDO 510. If the stopping condition is the same as the example above (i.e., only crosses a single file border), then generator 140 stops at MDO 510 and does not follow association relationship 540 across a second file border to MDO 515. When, however, generator 140 crosses file borders through aggregation relationships, as described above, generator 140 follows subsequent association relationships across one file border. For example, generator 140 follows aggregation relationships from MDO_1 to MDO_3 to DO_3.1 to DO_3.2. DO_3.2 has an association relationship 545 to DO_1.4. Because generator 140 arrived at MDO 515 through an aggregation relationship (i.e., 525), generator 140 follows association relationship 545 across one file border to DO_1.4. Generator 140 determines that it has crossed a file border by following the association to DO_1.4 and, determining that DO_1.4 is not a main development object, asking DO_1.4 what its MDO is. Upon determining that MDO_1 is the MDO of DO_1.4, generator 140 adds MDO_1 to the first list. If, for example, association relationship 545 went to a different MDO, for example, MDO_5 (not shown), then MDO_5 would be added to the first list. Similarly, because generator 140 follows aggregation relationships to DO_4.2, generator 140 also follows the subsequent association relationship 550 across one file border to MDO_1.

Through the aggregation and the association relationships, generator 140 adds MDOs 505 and 510 (via association) and 515 and 520 (via aggregation) to the first list. If any of these MDOs are on a second list, indicating which MDOs have changed, then generator 140 re-generates MDO 505, regardless of whether MDO 505 has been changed. As described above, a MDO (e.g., 505) includes non-MDO development objects (e.g., DO_1.1, DO_1.2, DO_1.3, and DO_1.4), so if any of these development objects have changed, then the MDO is considered changed.

Referring to FIG. 6, after generator 140 has determined whether to re-generate the MDO under consideration (e.g., executing elements 615-635), generator 140 determines (640) whether all MDOs related to the root MDO have been considered. This determination can be based on different stopping conditions. For example, one condition can be that each of the direct children of the root MDO is considered. If there are more MDOs to be considered, then generator 140 identifies (645) the next child MDO as the MDO under consideration and goes back to element (615) of process 600 to repeat elements 615-635 for the new MDO under consideration. Using metamodel 300 for an example, if the root MDO is component 305, then after the component MDO the model MDO 310, the controller MDO 340 and the View MDO 335 each become the MDO under consideration. Generator 140 repeats elements 615-635 for each of those MDOs.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed and apparatus can be implemented by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special purpose logic circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/ or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. The alternative examples are for illustration only and not to limit the alternatives in any way. The steps of the invention can be performed in a different order and still achieve desirable results.

What is claimed is:

1. A computer program product tangibly embodied in machine-readable storage device, for using incremental generation to develop applications, the computer program product being operable to cause data processing apparatus to:
store a plurality of metadata development objects corresponding to a metamodel, wherein the development objects comprise a plurality of development objects specified as main development objects;
identify a first main development object;
identify main development objects related to the first main development object by an aggregation relationship, wherein an aggregation relationship is a whole-part relationship between an aggregate and one or more constituent parts;
identify main development objects related to the first main development object by an association relationship, wherein an association relationship represents a connection between between two classes;
determine if any identified main development objects have changed; and
re-generate the first main development object if any identified main development objects have changed,
wherein the main development objects are persisted in separate files and correspond to file borders; and
wherein identifying main development objects related to the first main development objects by the association relationship comprises identifying main development objects related to the first main development objects by the association relationship by following association relationships only across a single file border to a next main development object.

2. The computer program product of claim 1, wherein identifying main development objects related to the first main development objects by the aggregation relationship comprises identifying main development objects related to the first main development objects by the aggregation relationship by following all aggregation relationships to other main development objects.

3. The computer program product of claim 1, wherein identifying main development objects related to the first main development objects by the association relationship comprises identifying main development objects related to the first main development objects by the association relationship by following aggregation relationships and then a subsequent association relationship only to a next main development object.

4. The computer program product of claim 1, further comprising instructions to cause data processing apparatus to:
identify a second main development object,
wherein identifying the first main development object comprises identifying the first main development object that is a root main development object associated with the second main development object.

5. The computer program product of claim 4, wherein identifying the second main development object comprises identifying a non-main development object as a starting point and asking the non-main development object what its main development object is.

6. The computer program product of claim 4, further comprising instructions to cause data processing apparatus to:
for each child main development object of the root main development object,
identify a child main development object that has not been considered;
identify main development objects related to the child main development objects by an aggregation relationship;
identify main development objects related to the child main development object by an association relationship;
determine if any identified main development objects have changed; and
re-generate the child main development object if any identified development objects have changed.

7. The computer program product of claim 1, further comprising instructions to cause data processing apparatus to identify all main development objects that have changed based on identified files that have changed.

8. The computer program product of claim 7, wherein the identified files that have changed are identified by a resource tree traversal or a notification from the metamodel to which the main development objects correspond.

9. The computer program product of claim 1, wherein the first main development object corresponds to a development object identified by a development tool making a request for re-generation.

10. A system for using incremental generation to develop applications, the system comprising:
one or more computers;
a repository for storing a plurality of metadata development objects corresponding to a metamodel, wherein the development objects comprise a plurality of development objects:
a generator comprising:
a search module configured to identify a first main development object, to identify main development objects related to the first main development objects by an aggregation relationship, wherein an aggregation relationship is a whole-part relationship between an aggregate and one or more constituent parts, and to identify main development objects related to the first main development object by an association relationship, wherein an association relationship represents a connection between two classes;
a comparator module configured to determine if any identified main development objects have changed; and
a generation module configured to re-generate the first main development object if any identified development objects have changed,
wherein the main development objects are persisted in separate files and correspond to file borders; and
wherein identifying main development objects related to the first main development objects by the association relationship comprises identifying main development objects related to the first main development objects by the association relationship by following association relationships only across a single file border to a next main development object.

11. The system of claim 10, further comprising a development tool configured to identify files that have changed, wherein the comparator module is further configured to determine if any identified main development objects have changed based on information from the development tool identifying files that have changed.

12. The system of claim 10, further comprising a development tool, wherein the comparator module is further configured to receive an indication of the first main development object from the development tool.

13. The system of claim 10, further comprising a cache, wherein the comparator module is further configured to store the identified main development objects in the cache.

14. A method for using incremental generation to develop applications, the method comprising:
   storing a plurality of metadata development objects corresponding to a metamodel;
   identifying a first main development object;
   identifying main development objects related to the first main development objects by an aggregation relationship, wherein an aggregation relationship is a whole-part relationship between an aggregate and one or more constituent parts;
   identifying main development objects related to the first main development object by an association relationship, wherein an association relationship represents a connection between between two classes;
   determining if any identified main development objects have changed; and
   re-generating the first main development object if any identified main development objects have changed,
      wherein the main development objects are persisted in separate files and correspond to file borders; and
      wherein identifying main development objects related to the first main development objects by the association relationship comprises identifying main development objects related to the first main development objects by the association relationship by following association relationships only across a single file border to a next main development object.

15. The method of claim 14, wherein identifying main development objects related to the first main development objects by the aggregation relationship comprises identifying main development objects related to the first main development objects by the aggregation relationship by following all aggregation relationships to other main development objects.

16. The method of claim 14, further comprising:
   identifying a second main development object, wherein identifying the first main development object comprises identifying the first main development object that is a root main development object associated with the second main development object.

17. The method of claim 16, further comprising:
   for each child main development object of the root main development object,
      identifying a child main development object that has not been considered;
      identifying main development objects related to the child main development objects by an aggregation relationship;
      identifying main development objects related to the child main development object by an association relationship;
      determining if any identified main development objects have changed; and
      re-generating the child main development object if any identified development objects have changed.

\* \* \* \* \*